F. A. BRUN.
MANUFACTURE OF GEAR WHEELS.
APPLICATION FILED MAY 26, 1905.

935,636.

Patented Oct. 5, 1909.
2 SHEETS—SHEET 1.

Witnesses
A. J. Hadden
H. Pausch

Inventor
Frédéric Amédée Brun
by his Attorney R. Hadden

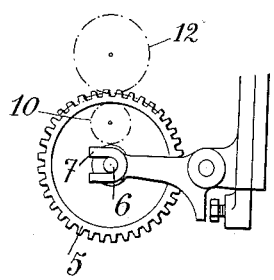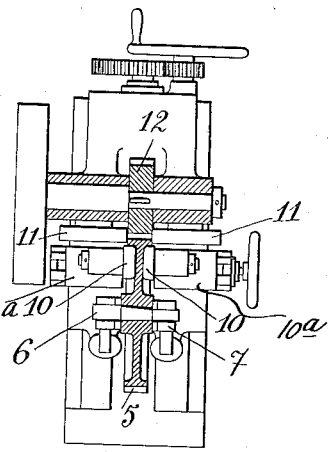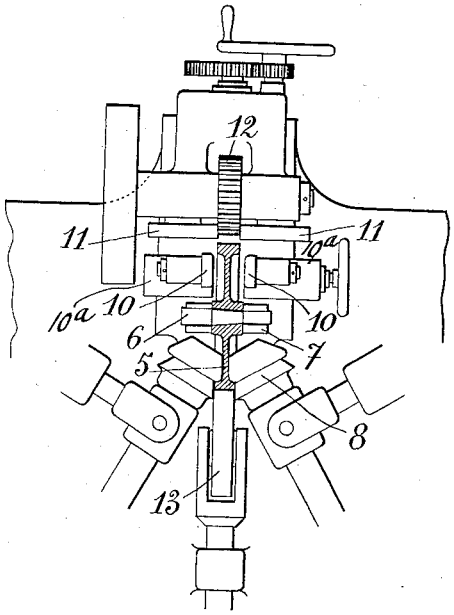

UNITED STATES PATENT OFFICE.

FRÉDÉRIC AMÉDÉE BRUN, OF PARIS, FRANCE.

MANUFACTURE OF GEAR-WHEELS.

935,636.         Specification of Letters Patent.     Patented Oct. 5, 1909.

Application filed May 26, 1905. Serial No. 262,560.

*To all whom it may concern:*

Be it known that I, FRÉDÉRIC AMÉDÉE BRUN, a citizen of the French Republic, residing at Paris, France, have invented certain new and useful Improvements in the Manufacture of Gear-Wheels, of which the following is a specification.

This invention relates to an improved method and apparatus for the manufacture of gear wheels by laminating and circumferential impressing.

Figure 1:
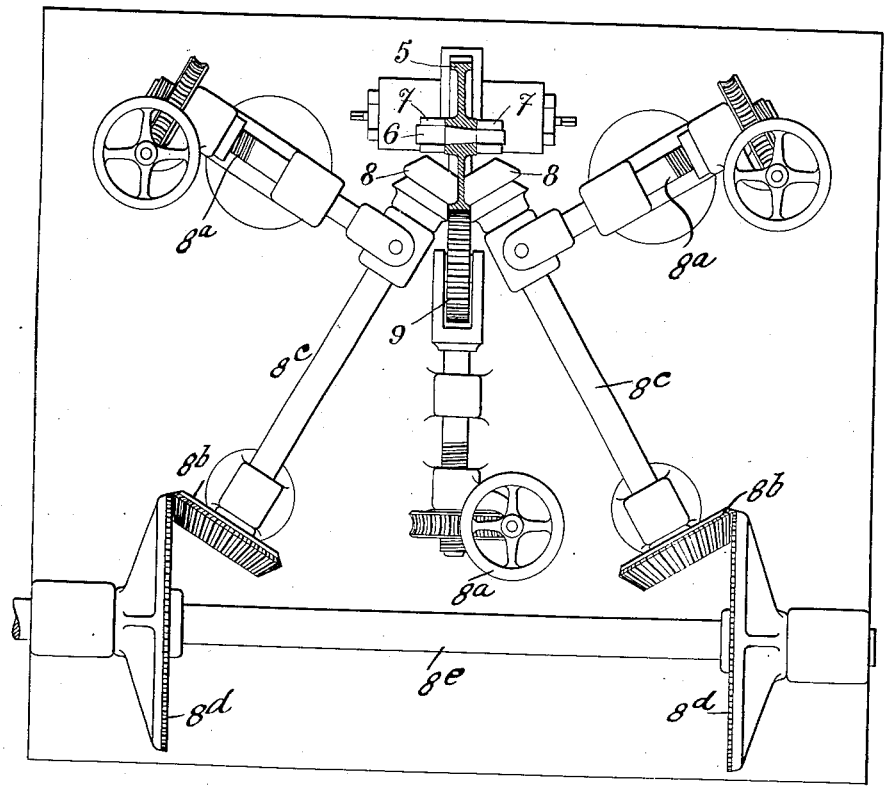
Figure 2:
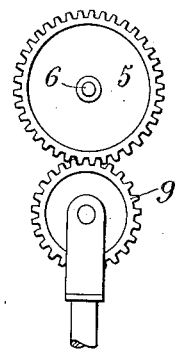
Figure 3:
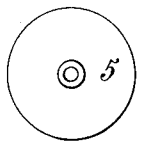
Figure 4:

In the annexed drawing Figure 1 is a diagrammatic plan-view of the apparatus for carrying out the improved method. Fig. 2 is a detail view representing a cutting wheel or roller for forming the teeth of the gear-wheels, and Figs. 3 and 4 are detail views representing the work ready to be finished or dressed. Fig. 5 is a plan view of the impressing apparatus apart from the laminating apparatus, Fig. 6 is a partial side view representing the impressing wheel and the finishing wheel, and Fig. 7 is a plan view of an impressing device mounted on a laminating device.

The manner in which the method is carried out and the apparatus for doing so is as follows:

A block of metal suitable to the dimensions of the wheel to be manufactured is heated to forging temperature and is then roughly shaped in a stamp or press to the form shown in Figs. 3 and 4. The shaped piece 5 is then placed on the axle 6 (Fig. 1) supported by the bearings 7 and is laminated, while hot, between two inclined laminating rollers 8 (Fig. 1) having their extended axes meeting in the axis of the work, while a suitably toothed loosely mounted impressing roller 9 is caused to act on the outer circumference of the work 5. Rolls 8 are driven through bevels $8^b$ and shafts $8^c$ from gears $8^d$ mounted on shaft $8^e$. The relative positions of the work 5, laminating rollers 8 and impressing roller 9 are regulatable within certain limits by means of worm and screw gear $8^a$ or other suitable adjusting devices. The laminating and circular impressing can be simultaneously effected on one machine, or can be carried out by means of different machines so constructed that the laminating can be effected between the initial and final impressing of the teeth.

If the rim is to be exactly calibrated before it is cut, a smooth roller 13 (Fig. 7) can be substituted for the cutting roller 9. When the calibrating has been effected the laminating rollers 8 and the smooth roller 13 are removed and counter-pressure or supporting rollers 10 mounted in adjustable slides $10^a$ are brought in contact with the work 5, an impressing roller 12 being thereupon brought up to produce the teeth on the circumference of the work. The impressing apparatus can thus be rendered independent of the laminating device, and can be mounted on the latter, as shown in Fig. 7, or can be separately arranged as shown in Figs. 5 and 6.

It must be noted that the impressing is effected without positive connection between the center of the work and the impressing roller, that is to say, it is effected in the same manner as in a lathe. For this reason only one of the two parts for example the impressing roller, need be positively controlled, the work being automatically moved during the production of the teeth.

The advantages secured by the method of manufacture described are, firstly, a considerable reduction in the cost and weight of the gear wheels, and secondly, perfect homogeneousness of the metal used, with the resulting increase of strength.

I am aware that the method of laminating is old and that it has also been proposed to form the teeth by impression, but in this invention the impression takes place only when the rim itself is supported by either the laminating rollers or supporting rollers or disks used in lieu thereof. Thus there is no reaction at the hub of the wheel but all reaction is taken at the rim itself.

What I claim is:

1. The method of manufacturing gear wheels, consisting in subjecting a blank on its periphery to the rolling action of a tooth impressing device, and simultaneously laminating the blank between its axial and peripheral portions.

2. The method of manufacturing gear wheels, consisting in impressing teeth in the periphery of a hot blank and simultaneously laminating said blank behind its peripheral portion and supporting the said peripheral portion by the laminating means.

3. The method of forming a gear wheel, which consists in subjecting the peripheral portion of a properly shaped blank to the action of impressing means, and between initial and final impressing actions, subjecting the blank to the action of laminating means.

4. The method of manufacturing gear wheels, consisting in rotating a blank and simultaneously impressing teeth in the periphery of said blank and laminating the web portion of the blank in rear of the peripheral portion in which the teeth are formed.

5. The method of manufacturing gear wheels, consisting in rotating a blank and simultaneously impressing teeth in its periphery, opposing the radial pressure toward the axial or hub portion of the blank and simultaneously laminating the blank between its axial or hub portion and the peripheral portion during the impressing of teeth in said peripheral portion.

In witness whereof I have signed this specification in the presence of two witnesses.

FRÉDÉRIC AMÉDÉE BRUN.

Witnesses:
MARIUS HAEBERLIN,
CHARLES RONEL.